Patented June 25, 1929.

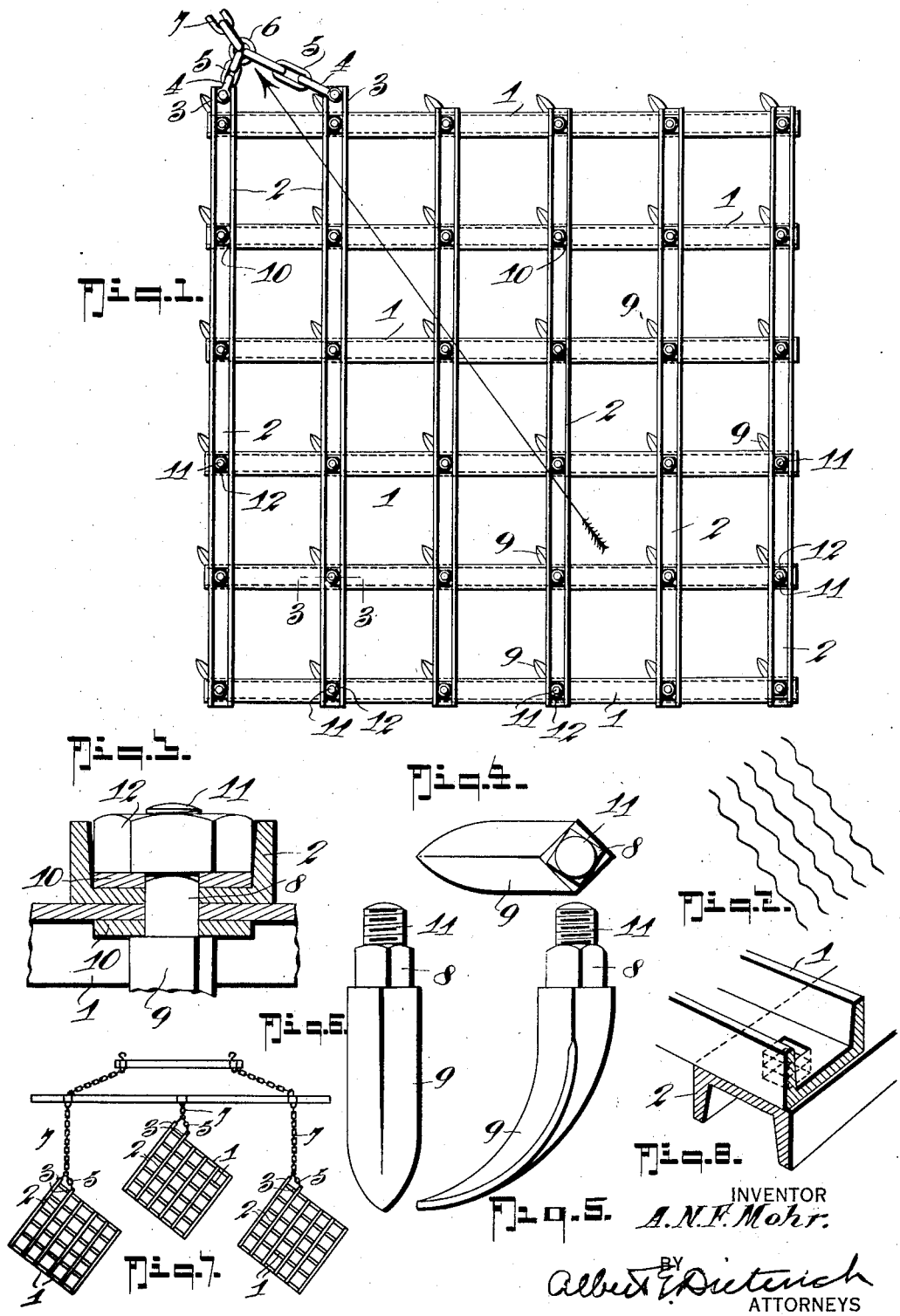

1,718,248

UNITED STATES PATENT OFFICE.

ANDERS N. F. MOHR, OF BOZEMAN, MONTANA.

HARROW.

Application filed January 12, 1927. Serial No. 160,649.

The invention generally has reference to cultivators and has for its object to provide a simple improved harrow structure in which the drag teeth are so positioned relatively to the draft line that no two teeth follow in the same path of travel and because of such positioning the teeth are caused to travel in undulated or wave-like paths.

The invention further seeks to provide a simple improved harrow framing composed of a plurality of crossed bars for supporting the teeth in spaced relation, the means for securing the crossed bars together constituting the teeth themselves.

The invention further resides in the provision of means for so securing the cross bars by the teeth at the points of intersection of the said bars that all teeth will be held directed in like direction and against rotation, and the cross bars will be held rigidly to position against diagonal distortion, thus assuring proper rigidity of the framing and equi-distant spacing of the teeth, means being provided on certain of the cross bars for positioning the draft line to effect the individual line travel of the teeth.

With the above and other objects in view that will hereinafter appear, the invention still further resides in the novel details of construction, combination and arrangement of parts, all of which will be first fully described in the following detailed description, then be particularly pointed out in the appended claims, reference being had to the accompanying drawing, in which:—

Figure 1 is a plan view of the invention.

Figure 2 is a diagrammatic ground plan indicating the path of travel of several teeth.

Figure 3 is an enlarged vertical cross section taken through the center of one cross bar at a point where another cross bar is secured thereto by a tooth.

Figure 4 is a plan view of an individual tooth dismounted.

Figures 5 and 6 are edge and rear face views respectively of an individual tooth.

Figure 7 is a diagrammatic plan view illustrating a means for mounting a battery of my improved cultivators to a single draft device.

Figure 8 is a sectional perspective view of portions of two cross bars at a point of intersection.

In the drawings 1 indicates a plurality of parallelly spaced channel iron bars and 2 a plurality of similarly positioned transverse channel bars, the flanges of the first mentioned bars being directed downwardly and those of the last mentioned bars being directed upwardly, thus presenting the flat faces of the bars in opposition and directing the flanges thereof away from each other.

Two of the bars 2 at one corner of the frame formed by the bars 1 and 2 are extended slightly as at 3 to constitute draft mountings and the said extended ends are each equipped with a clevis 4. To these clevises the diverging chain sections 5, leading from the draft ring 6, are connected, the draft ring being in turn connected to the common draft chain 7. By thus positioning the draft connection, when traction is applied to the chain 7 the frame will be pulled over the ground in the general direction of the arrow shown in Figure 1 but in the actual direction of the wavy lines shown in Figure 2.

At their points of intersection the bars 1 and 2 are provided with registering or aligning squared apertures to receive the squared heads 8 of the harrow teeth 9 which are shaped as indicated in Figures 3, 4 and 5.

Where the bases of the squared portions 8 of the teeth connect with the main bodies of the teeth they are provided with shoulders which engage upwardly with squared washers 10 fitted into the channel flanges of the bars 1. The upper ends of the squared portions 8 also pass through squared washers 10 similarly positioned in the upper channel flanges. Extending upwardly from each squared head is a threaded shank 11 for receiving a nut 12 by which the tooth is secured to position.

The squared aperture and squared washer arrangement not only serves to secure the teeth to position and against rotation but also serves to secure the various channel bars 1 and 2 together in rigid relation, those of each set being in parallelism.

The channel bars thus collectively form a square frame comprising a plurality of hollow squares, the intersecting points of the cross bars being secured by the teeth they serve to mount and being in diagonal alignment and symmetrically and equi-distantly spaced.

It is desired that no two teeth follow in the same path and this is accomplished by the simple means of attaching the draft connection as described. It will be observed by reference to the arrow in Figure 1 that the frame does not travel on a line coincident with diagonals intersecting the teeth mountings in a given direction, but generally on the line indicated by the arrow which effectively provides for travel of the harrow teeth in distinctly individual paths.

In the drawings I have shown forwardly curved teeth. To position these teeth with their effective bodies in line with the direction of travel of the harrow, I offset the squared heads 8 of the teeth so that the sides of the heads may parallel the cross bars 1 and 2 yet the tooth body proper will follow the line of travel of the harrow frame. Thus also the difficulty of forming the square apertures in the cross bars off center is obviated.

From the foregoing description, taken in connection with the accompanying drawings, it is thought that the novel details of construction, the manner of use, and the advantages of the invention will be readily apparent to those skilled in the art to which it relates.

What I claim is:

1. In harrows, a rectangular frame composed of a series of longitudinal and a series of transverse cross bars, the end bar of one series and the bar paralleling the same next adjacent being extended a short distance to form draft connections, a draft ring, chains connected to the draft ring and diverging therefrom and connected to the bar extensions, a draft line connected to the draft ring, and teeth depending from the frame.

2. In harrows, a rectangular frame composed of a series of longitudinal and a series of transverse cross bars, the end bar of one series and the bar paralleling the same next adjacent being extended a short distance to form draft connections, a draft ring, chains connected to the draft ring and diverging therefrom and connected to the bar extensions, a draft line connected to the draft ring, teeth depending from the frame, said draft chains being of unequal length.

3. In harrows, a frame composed of intersecting channel bars arranged with their flat faces engaging and being provided with aligning apertures at the points of intersection, teeth having shanks to pass through the bar apertures, means to clamp the teeth and bars together, and non-circular elements immovable relatively about the axes of the teeth and engaging the flanges of the channel bars to prevent movement of the teeth about their axes and prevent movement of the channel bars on one another.

4. In a harrow wherein is provided a rectangular frame composed of intersecting bars having squared registering apertures at the intersections of and having their sides paralleling the intersecting bars, and means to provide a line of draft approaching alignment with but out of alignment with an imaginary corner-to-corner diagonal of said frame; teeth depending from the frame and each comprising a body bent forwardly in alignment with the line of draft, a square shank to fit the registering apertures at an intersection and offset so that a diagonal of said shank parallels a diagonal of said frame, and means to secure the teeth to position.

ANDERS N. F. MOHR.